United States Patent Office 3,047,895
Patented Aug. 7, 1962

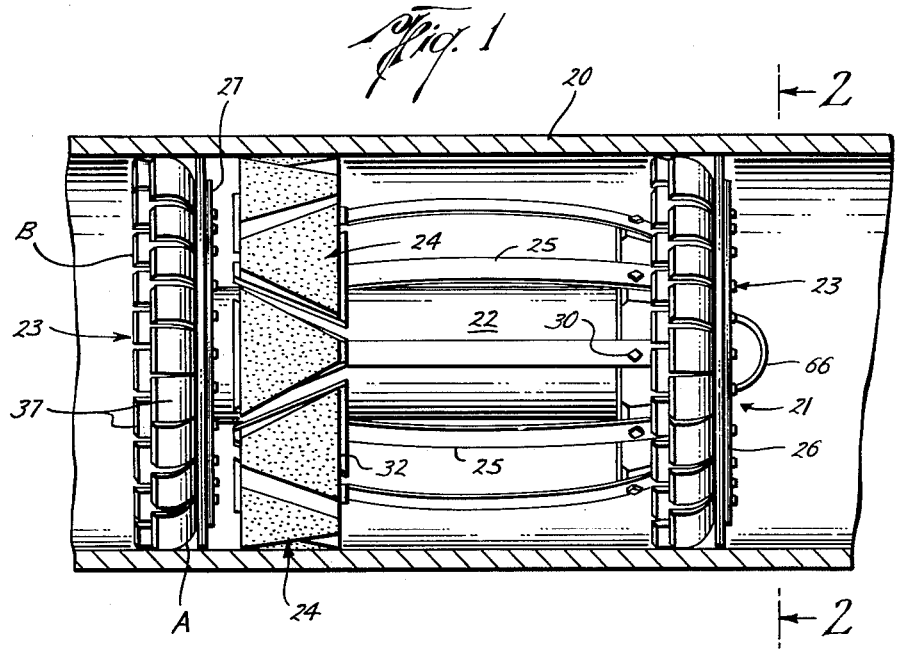
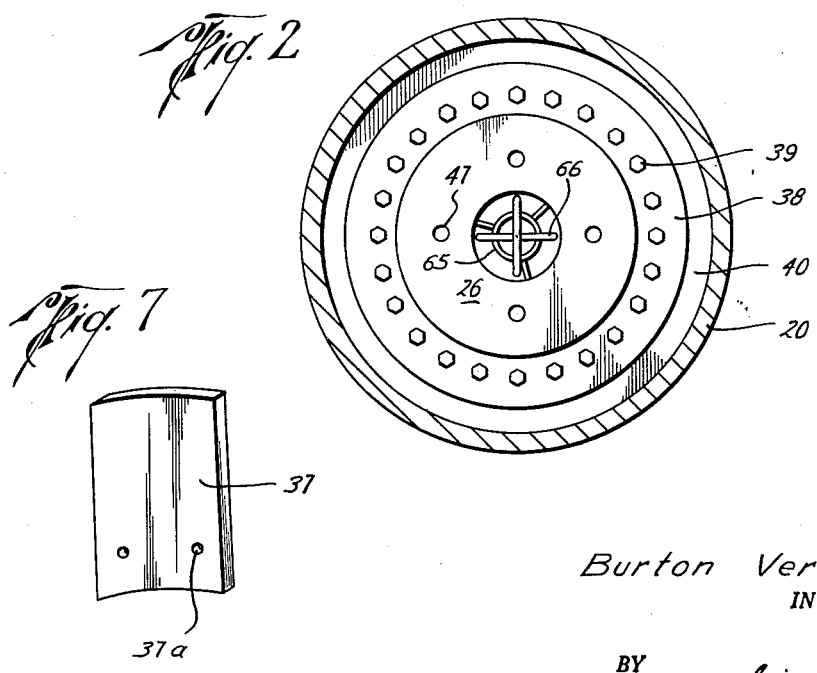

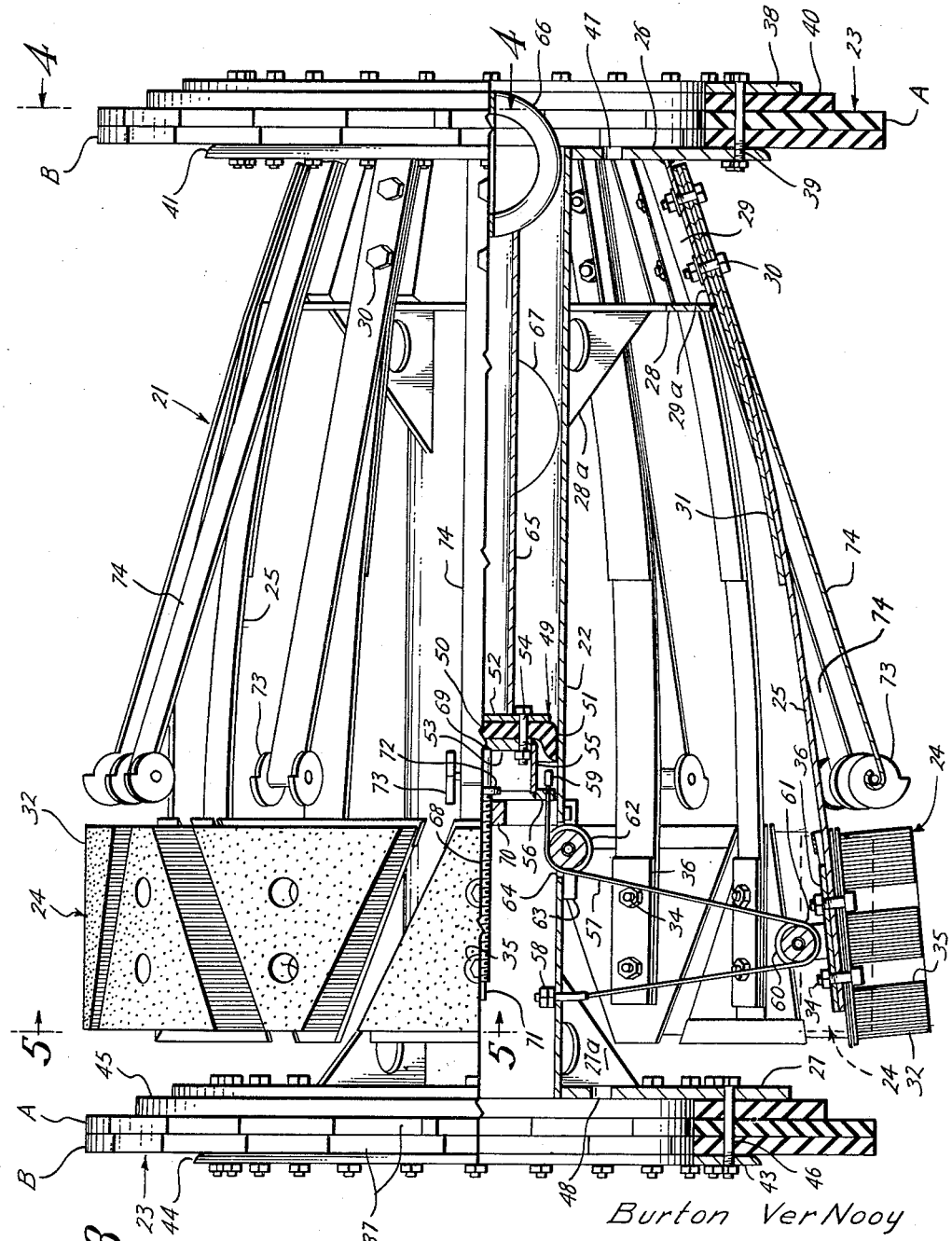

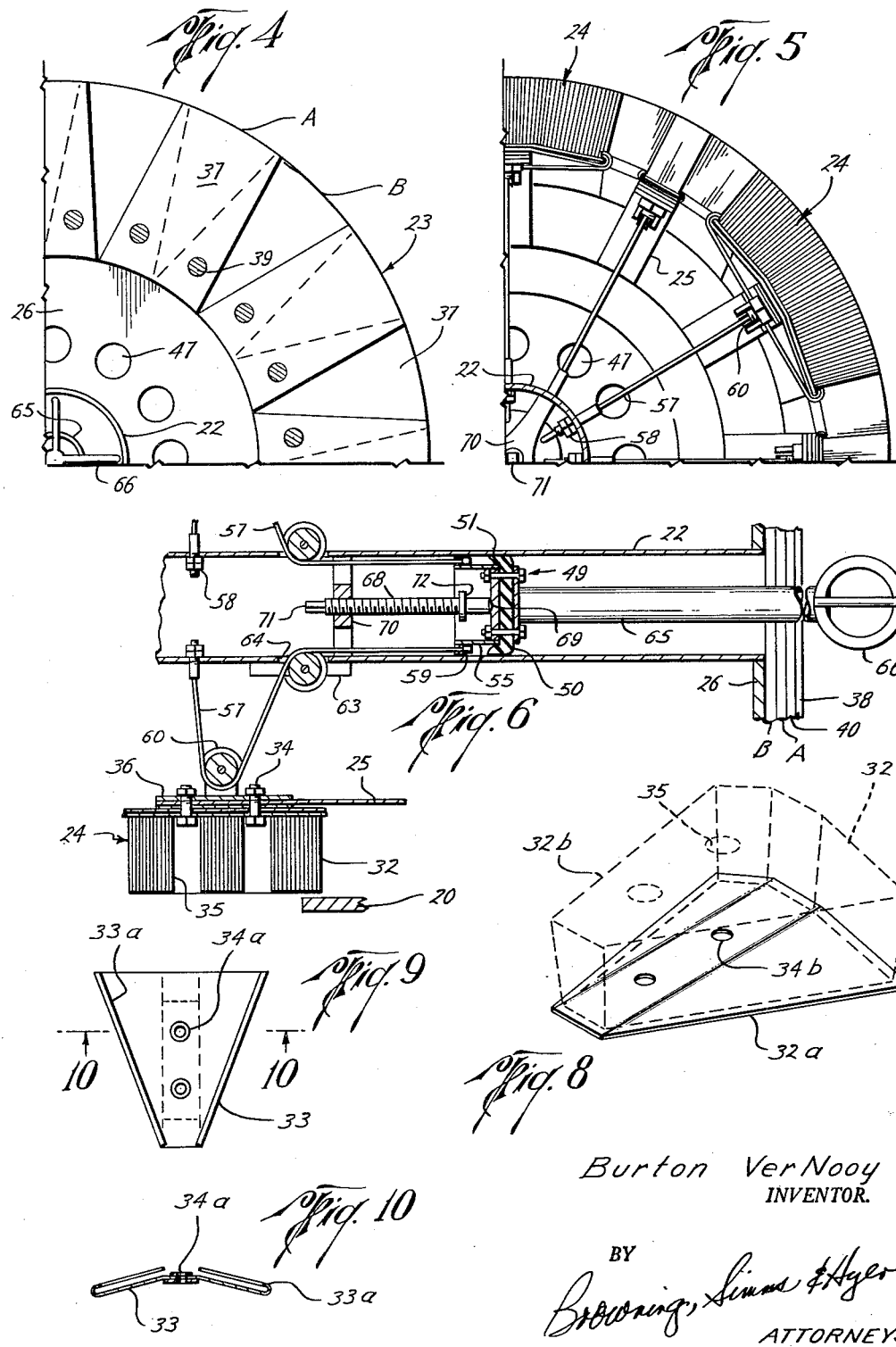

3,047,895
PIPELINE SCRAPING AND BATCHING DEVICE
Burton Ver Nooy, Tulsa, Okla., assignor to
T. D. Williamson, Inc., Tulsa, Okla.
Filed Mar. 19, 1957, Ser. No. 647,035
13 Claims. (Cl. 15—104.06)

This invention relates to improvements in devices used in removing scale, rust and other foreign substance from the inside walls of pipelines as well as in separating fluids during their passage through the line.

Devices of the type contemplated by the present invention include a body adapted to be moved longitudinally through a pipeline and parts carried about the body for engagement with the pipeline wall during movement of the body therethrough. These parts may comprise scraping elements resiliently urged away from the body and tightly engaged with the pipeline wall for scraping such foreign substances therefrom. On the other hand, these parts may comprise cups disposable about the body in longitudinally spaced apart relation and sealably engageable with the pipeline so as to separate fluids on each side of the cups.

The cups may be provided for the purpose of separating or batching different fluids during their passing through the line. Also, when disposed about a body in the manner described, they permit either the batching or the scraping devices to be propelled through the line by means of a pressure differential thereacross. It is further conventional to arrange the scraping elements in two distinct rows, with the elements of one row overlapping laterally of elements in the other row so as to provide full scraping coverage about the pipeline wall.

The design of such devices is complicated by various irregularities in the pipeline as well as by their intended usage. For example, it may be necessary for the device to maneuver sharp bends in the line and pass through restrictions and enlargements therein. It may also be desired to use the device in pipelines of somewhat different size. In each of these instances, it is important that at least one of the cups maintains its peripheral engagement with the pipeline wall and, in the case of scrapers, that the scraping elements maintain full scraping coverage therewith.

An object of this invention is to provide an improved pipeline device of the type above-described having these characteristics of maneuverability and flexibility.

Another object is to provide a pipeline scraper in which the scraping elements are carried from and arranged about the body in such a manner as to reduce the length of the scraper to a minimum and thereby permit it to maneuver the sharpest of bends while, at the same time, providing full scraping coverage about pipeline walls of different diameter.

Another object is to provide a pipeline scraping and batching device having cups thereabout which will maintain peripheral engagement with the pipeline during passage through such different diameters and which are of such construction as to enable them to be manufactured at a lesser cost than cups now in use.

The force which the scraping elements of a scraper exert against the pipeline wall may be quite large. When the scraping elements are urged outwardly by leaf springs or the like connected to the scraper body, this force increases as the elements are urged toward the body. As a result, it is difficult to relieve this force sufficiently to insert and permit removal of the scraper. These difficulties are compounded by those encountered in obtaining access to the scraping elements during insertion and removal whereby such forces may be relieved, particularly when they are disposed between spaced apart cups about the body. Further difficulties arise when the scraper becomes stuck in a remote and inaccessible part of line.

It is, therefore, still another object of this invention to provide a pipeline scraper having means accessible from the front and rear thereof for facilitating the relieving of this force during insertion and removal.

A further object is to provide a pipeline scraper having novel means for automatically relieving the force exerted by leaf spring-mounted cleaning elements when the scraper becomes stuck in the line, so that the scraper will be dislodged for continued movement through the line.

Other objects, advantages and features of this invention will be apparent to one skilled in the art upon a consideration of the written specification, the attached claims and the annexed drawings.

In the drawings, wherein like reference characters are used throughout to designate like parts:

FIG. 1 is a side elevational view of a scraper constructed in accordance with the present invention and disposed within a pipeline for scraping the inside wall of same upon movement from left to right;

FIG. 2 is a front elevational view of the scraper of FIG. 1, as seen from broken lines 2—2 thereof;

FIG. 3 is an enlarged side view of the scraper similar to FIG. 1, but partly in section and removed from the pipeline;

FIG. 4 is a cross-sectional view of part of a forward portion of the scraper, and taken substantially along broken line 4—4 of FIG. 3;

FIG. 5 is a cross-sectional view of part of a rearward portion of the scraper, and taken substantially along broken line 5—5 of FIG. 3;

FIG. 6 is a longitudinal sectional view of a central portion of the scraper, as seen in part in FIG. 3, but with the cleaning elements retracted to a position to permit insertion of the scraper into the open end of a pipeline;

FIG. 7 is a detailed perspective view of a flap of the cup about the scraper body;

FIG. 8 is a perspective view of a scraping element brush with the bristles shown in phantom;

FIG. 9 is a plan view of a plate for mounting the brush of FIG. 8; and

FIG. 10 is a cross-sectional view of the plate of FIG. 9, taken substantially along broken line 10—10 thereof.

In accordance with one novel concept of the present invention, each cup disposed about the body of either a batching or scraping device comprises a plurality of separate and substantially identical flaps connected to the body in outwardly extending relation therefrom. Each of the flaps is foldable along its width so that the cup will adapt itself to a pipeline diameter less than the outside diameter of the unfolded flaps. They are arranged in substantially adjacent annular rows with adjacent flaps in each row providing an outwardly divergent tapered space between their side edges, and the side edges of flaps in adjacent rows overlapping laterally of one another at their inner ends. Thus, folding of the flaps within the range of their overlapping relation will enable peripheral engagement of the cup with the pipeline wall during passage through a corresponding range of pipeline diameters. Since the flaps are identical, they are inexpensive to manufacture and may be used interchangeably with different cups.

In accordance with another novel concept of the present invention, a plurality of scraping elements are carried by a scraper body for resilient engagement with the wall of the pipeline in a single row annularly of the body. Each such scraping element is wider at one end than at the other and has its wide end disposed laterally opposite the narrow ends of elements to each side thereof, and these adjacent elements are spaced sufficiently close together so that their wide ends overlap laterally of one another when said elements are engaged with the pipeline wall. Thus, this single row of scraping elements provides full coverage about the pipeline wall during passage through different pipeline diameters, and enables the scraper to be considerably shorter than conventional scrapers employing two annular rows of scraping elements.

In accordance with a preferred embodiment of the invention, each scraping element has opposite sides which are flat and divergently tapered in a longitudinal direction opposite to that in which the opposite sides of adjacent elements are tapered. It is also contemplated that the scraping elements will be carried from the body by arms, such as leaf springs, connected to such elements in substantially balanced relation laterally thereof so as preventing twisting of said elements should they encounter a valve or other opening in the line. Furthermore, these arms may each be of equal length so as to provide each element with substantially identical loading characteristics.

A guide member is provided for movement longitudinally along the body, and each of the scraping elements is connected to the guide member for retraction from the pipeline wall, upon movement of said member in one direction along the body, so as to relieve the force which the elements exert on the wall. The scraping elements may be so retracted, when either end thereof is inaccessible, by means of a part accessible from the other end for moving the guide member in said one direction. Thus, as the scraper is being inserted into a line, the part accessible from the rear end of the body may be actuated so as to retract the scraping elements to a position in which they will pass easily into the line. On the other hand, removal of the scraping elements from a pipeline may be facilitated by actuation of the part accessible from the front end of the body. In the latter case, retraction of the scraping elements relieves the force which they exert upon the pipeline wall sufficiently to permit the scraper to be pulled longitudinally therefrom.

In accordance with a still further novel concept of the present invention, a scraper having leaf spring-mounted scraping elements is provided with piston means on the body thereof having a pressure responsive face confined for communication with fluid behind one of the cups and arranged to urge the piston means in one direction due to the pressure of said fluid. This piston means is connected to each of the scraping elements for retracting them upon movement of the piston means in said one direction. Thus, when the scraper becomes stuck in the line, the resulting increase in pressure differential across the cup will automatically relieve the force the scraping elements exert on the pipeline wall sufficiently to permit the scraper to dislodge from its stuck position. As will be apparent from the detailed description to follow, this arrangement is also useful for other purposes.

Preferably, this piston means comprises a single piston to which each scraping element is connected. Furthermore, it is contemplated that the body of the scraper may be tubular and that the above-described guide members may comprise a piston disposed within the tubular body for the purposes previously mentioned.

Referring now in detail to the above-described drawings, the device of the present invention, which is shown within a pipeline 20 in FIG. 1 and removed therefrom in FIG. 3, is designated in its entirety by reference character 21. The body 22 of the device comprises a tubular sleeve which is open at body ends and disposed for movement longitudinally through the pipeline. Arranged about each opposite end of the body 22 for peripheral engagement with the pipeline wall at longitudinally spaced apart locations are a pair of cups 23.

As previously mentioned, a device so constructed may be used as a batching pig for separating fluid on opposite sides of the cups. As shown in FIG. 1, this device may be propelled from left to right by means of pressure fluid applied to the left or rearmost cup 23. Thus, the separated fluids may be conveyed longitudinally within the line.

It is also contemplated that the device may be used as a scraper and, for this purpose, a plurality of scraping elements 24 are carried by the body 22 for resilient engagement with the wall of the pipeline intermediate the cups. As the scraper is moved from left to right, rust, scale and other foreign substance is scraped from the inside wall of the pipeline by means of the scraping elements 24 and then pushed forwardly through the line in front of the cups 23.

As previously mentioned, the scraping elements are carried about the body for resilient engagement with the pipeline wall in a single annular row. More particularly, each scraping element is individually carried from the body by a leaf spring 25 connected at its inner end to the body and at its outer end to the scraping element. As best shown by the lowermost scraping element in FIG. 3, the leaf springs 25 flare outwardly from the body so that when they are unstressed, the outer surfaces of the scraping elements will describe a circle which is larger than the inside diameter of the pipeline to be cleaned. Thus, when the scraper is disposed within the line and the scraping elements are forced inwardly, the leaf springs will be stressed so as to maintain such elements in forceful engagement with the pipeline wall. The position of the scraping elements with the leaf springs stressed a substantially amount is illustrated by all the scraping elements of FIG. 3 except the lowermost, which is stressed only slightly. Obviously, as the scraping elements are further collapsed, as shown in FIG. 1, the force due to the spring will increase.

It will be understood that the leaf springs 25 are merely illustrative and that other well known types, such as are used on the "GP" type of scraper manufactured by the assignee of the present invention, may be used.

A pair of annular discs 26 and 27 are welded or otherwise secured about the forward and rearward ends, respectively, of the body for supporting the cups 23 in a manner to be described hereinafter. The rearward disc is reinforced by braces 27a, while the forward disc 26 is reinforced by a plurality of longituidnal channel members 29 connected between said disc and an annular plate 28 mounted in surrounding relation to the body rearwardly of the disc 26 by means of braces 28a. These channel members are arranged with their webs 29a disposed outwardly and extending angularly with respect to the body so that the springs 25 may be bolted thereto at 30 in outwardly flaring relation. A reinforcing liner 31 may be connected between the leaf springs 25 and webs 29a, as shown in FIG. 3.

Each scraping element comprises a brush 32 and a mounting plate 33 therefor which are releasably connected to the outer end of a leaf spring by means of bolts 34 and accommodating holes in the spring. As can be seen from FIG. 3, each spring 25 is of equal length intermediate its bolted connections with the body and a scraping element so that each such element is urged outwardly by an equal amount of force. Each brush comprises a base plate 32a to which are attached in any suitable manner a plurality of wire bristles 32b (indicated in phantom in FIG. 8), and each mounting plate 33 is provided with flanged side edges 33a into which the side edges of brush plate 32a outwardly of the bristles may be fitted. More particularly, the mounting plates and brush plates are provided with bolt holes 34a and 34b, respectively, and the brushes 32 are relieved of bristles at 35 so as to accommodate passage of the bolts 34. A liner 36 may be connected behind each leaf spring, as shown in FIG. 3. Obviously, the foregoing is merely illustrative of a suitable scraping element construction.

As previously mentioned, one end of each scraping element is wider than the other and, as shown in FIGS. 1 and 3, is disposed laterally adjacent the narrow ends of the elements to each side thereof. More particularly, the sides of adjacent elements are complementary to one another so that when the elements are engaged with the pipeline, as best shown in FIG. 1, each side of each scraping element is substantially parallel to a side of an adjacent element. Furthermore, each element is spaced sufficiently close to its adjacent elements so that the wide ends thereof overlap laterally of one another. In this manner, the single row of brush elements provides full coverage about the pipeline wall as the scraper is moved longitudinally therethrough. Since, in the normal position of the scraper, the opposite sides of adjacent scraping elements are substantially parallel to one another, the scraping elements have a maximum amount of freedom for movement toward and away from one another while maintaining full coverage about the pipeline wall.

As has also been previously mentioned, in the preferred embodiment of the invention, the opposite sides of each scraping element are divergently tapered in a longitudinal direction opposite to that in which the opposite sides of adjacent elements are tapered. Thus, as shown in FIGS. 8 to 10, each of the brush plates 32a and the mounting plate 33 includes a centrally disposed, longitudinally extending portion through which the bolt holes are provided for connection with the leaf spring, and triangular portions of equal area and shape on each side of the central portion. Thus, each scraping element assumes the shape of an isosceles triangle from which the apex has been removed. Obviously, with this construction, the wire bristles provide a bearing area which is balanced laterally of the leaf spring to which the scraping element is attached. Along its lateral width, each brush plate and mounting plate is bent about its centrally disposed, longitudinally extending portion substantially concentrically of the wall of the pipeline in which the scraper is to be used.

Generally speaking, the preferred embodiment of the scraping element provides a maximum amount of scraping surface. Although it is also preferred that the divergently tapered sides of each element be flat, it is obvious that they may be curved slightly or otherwise shaped in accordance with the teachings of the present invention.

Referring now particularly to the novel construction of the cup 23, it can be best seen from FIGS. 3 and 4 that each comprises two substantially adjacent rows of outwardly extending flaps 37. The forwardmost row in each cup is indicated by reference character "A" and the rearmost row by reference character "B." As previously mentioned, each separate flap 37 is of substantially identical construction. As best shown in FIG. 4, the adjacent flaps in each row are connected to the body 22 to provide an outwardly divergent tapered space between their side edges, and the side edges of flaps in adjacent rows overlap laterally of one another along their entire length. Thus, the outwardly divergent space between the flaps 37 of row "A" are filled by the flaps 37 of row "B." Conversely, the outwardly divergent spaces between the side edges of the flaps 37 in row "B" are covered by the flaps in row "A." The inner ends of the side edges of adjacent flaps are disposed in substantial abutment with one another.

Each of the flaps 37 is made of a material such as rubber and, as shown in FIG. 7, is substantially greater in width than in thickness so as to be foldable along its width as the cup moves into a pipeline having an inner diameter less than the outer diameter of the cup with the flaps unfolded. With reference to FIG. 1, it will be seen that the folded flaps in row "B" will nest within those of row "A," and that the side edges of the outer end of the flaps in each row will, upon folding, be substantially parallel to one another. Thus, as previously indicated, this cup provides a great amount of flexibility inasmuch as it will maintain peripheral engagement with the wall of the pipeline during passage through a line or lines which vary in diameter between that of the cup with the flaps unfolded, as shown in FIG. 4, and a considerably smaller diameter, the extent of which will be apparent from the description to follow of the manner in which the cups are supported about the body.

Obviously, this peripheral engagement will not necessarily provide a fluid tight seal with the pipe. However, such a seal is not required for the purpose of this invention, it being sufficient that the cups enable a pressure differential to be established thereacross for propelling the scraper through the line.

As indicated in FIG. 7, the side edges of each flap are substantially parallel to one another, and the inner and outer ends thereof are curved substantially concentrically of the body and wall of the pipeline, respectively. Bolt holes 37a in each flap permit its attachment to either of the discs 26 or 27 for extension outwardly from the body, in the manner previously mentioned. Obviously, the angle of extension may be other than perpendicular. For example, the flaps may slant toward the rear of the body. In the case of the forwardmost cup 23, the flaps 37 are connected between the support disc 26 and a nose ring 38 disposed forwardly thereof by means of through bolts 39 extending through bolt holes 37a.

The support disc 26 limits the amount which the flaps may be folded and is provided with a rounded edge 41 for engagement with the back side of the flaps 37 in the row "B." The rearmost cup 23 is similarly connected to the body by means of a disc 43 which is bolted at 46 to the support ring 27 so as to mount the two rows of flaps therebetween. The ring 43 thus limits folding of the flaps of this cup, similarly to the ring 26 for the forward cup, and is provided with a rounded edge 44 behind the flaps of row "B" thereof.

It will be appreciated, especially in connection with FIG. 1, that a point may be reached in which the flaps of row "B" which nest within those of row "A" of each cup 23 will be folded out of peripheral engagement with the pipeline wall. The resulting leakage through the spaces between adjacent flaps of row "A" might be sufficient to interfere with proper functioning of the device. Thus, rings 40 and 45 of rubber or other suitable material disposed about the pipe forwardly of the forward and rearward cups, respectively, are provided with outer peripheries adapted to engage the pipeline wall upon folding back of the flaps of the cups a predetermined amount. The exact location of these peripheries relative to the outer peripheries of the unfolded flaps may be determined in accordance with particular circumstances. As shown in FIG. 3, these rings are bolted between the flaps and discs 38 and 27 of the forward and rearward cups, respectively.

The aforementioned piston means for automatically retracting the leaf spring-mounted scraping elements 24 from the pipeline wall, so as to relieve the pressure thereon when the scraper becomes stuck in the line, preferably comprises a single piston 49 connected to each of the elements and having a pressure responsive face which is confined for communication with fluid in the line behind the rearmost cup 23. Obviously, if the scraper should become stuck in the line, the resulting pressure differential across the piston 49 will urge it forwardly. As can be seen from FIG. 3, this in turn retracts each of the scraping elements simultaneously.

More particularly, the piston 49 is sealably and guidably slidable within the tubular body of the scraper and serves also as a guide member for facilitating insertion and removal of the scraper, in a manner which will be more apparent from the description to follow.

As previously mentioned, this arrangement of the scraping elements 24 and piston 49 has other practical applications. For example, movement of the scraping elements at a relatively constant speed provides increased scraping efficiency and enables a determination of the approximate location of the scraper along the line. It is possible to so size the piston 49 relative to the strength of the leaf springs 25, or other mounting for the scraping elements 24, as to move the scraper at such a relatively constant speed when a pressure differential of predetermined amount is applied across the piston.

As the scraper encounters a restriction during movement through a pipeline, the springs 25 will be further compressed so as to increase the force exerted by the scraping elements on the pipeline wall. As a result, there is increased frictional resistance to movement of the scraper which causes it to slow down. However, as the scraper slows down, the pressure differential thereacross will increase so as to retract the elements from the wall of the pipeline and thereby decrease such frictional resistance to permit the scraper to tend to return to its original speed.

On the other hand, as the scraper encounters an enlargement, the compression of the springs is lessened such that the force exerted by the scraping elements is decreased. The resulting decrease in frictional resistance to movement of the scraper through the pipeline causes the scraper to speed up. This, in turn, decreases the pressure differential across the piston and permits the scraping elements to expand into tighter frictional engagement with the pipeline wall, which causes the scraper to tend to slow down to its original speed.

As can be seen from FIGS. 3 and 4, the inner ends of the flaps 37 terminate substantially coextensively of the rings 40 and 45 therefor and just inwardly of the connecting bolts 39 and 46. Disposed inwardly of the flaps and rings, but outwardly of the tubular body 22, are ports 47 and 48 through the support discs 26 and 27. These ports provide a small bypass for fluid behind the rearmost cup 23. The fluid so bypassed into the annular space about the body 22 intermediate cups as well as forwardly of the forwardmost cup 23 agitates the loosened debris which is swept forwardly of the cups. As previously indicated with respect to the peripheral engagement of the cups 23, this by-pass should be small to insure the build-up of a pressure differential behind the cups sufficient to move the scraper through the line.

As can be seen from each of FIGS. 3 and 6, the piston 49 comprises a cup 50 of rubber or other suitable material having rearwardly extending lips 51 sealably engageable with the inside wall of the tubular housing. The rear face of this piston is thus confined for communication with pressure fluid behind the cups 23, and the forward face for communication with another source of pressure fluid, such as the fluid forwardly of the cups 23. This cup 50 is reinforced by front and rear discs 52 and 53, respectively, and connected therebetween by means of through bolts 54. Secured to the rear disc 53 by means of welding or the like is a ring 55 having an outwardly projecting flange 56 thereon. Each scraping element 24 is connected to the flange 56 by means of a flexible cord 57 anchored at one end 58 to the wall of the body 22 and at its other end 59 to the flange 56, and strung along its intermediate length between a pulley 60 mounted beneath the scraping element by a trunnion 61 and a pulley 62 mounted on the tubular body by a support 63. As can be seen in each of FIGS. 3 and 6, the tubular body 22 is provided with an opening 64 therethrough to accommodate the pulley 62 as well as the flexible cord 57. As the piston is moved forwardly within the scraper body, the length of the cord 57 between the pulley 62 and the end 58 will be shortened so as to retract the scraping element. More particularly, since each of the scraping elements is identically connected to the piston 49, the elements will be retracted substantially simultaneously.

Although the above-described arrangement for connecting the scraping elements to the piston 49 is preferred due to its mechanical advantage, it is contemplated that other arrangements may be employed.

Although, in the preferred embodiment of the invention illustrated in the drawings, the piston also serves as a guide member for facilitating insertion and removal of the scraper with respect to the pipeline, it is further contemplated that the guide member may comprise a part or parts separate from the piston 49 or other means for automatically retracting the scraping elements. In fact, the novel features of the guide member are useful apart from any such means whatsoever.

In any case, however, in the preferred embodiment of the invention, a longitudinally extending tube 65 having a ring 66 at its forward end is connected as by welding to the front face of the piston 49. More particularly, the stem 65 is of such length as to dispose the ring 66 adjacent the front open end of the tubular body 22 when the piston 49 is in its rearmost position (see FIG. 3). This ring 66 is of such size to permit manipulation by a hitch or other suitable means applied thereto for the purpose of pulling the piston 49 forwardly so as to retract the scraping elements and thereby relieve the force exerted by the scraping elements on the pipeline wall in order to facilitate removal of the scraper from the line. As indicated in FIG. 3, the stem may be provided with guide fins 67 thereabout for maintaining it in a substantially central position within the tubular body 22.

The rearmost position of the piston is determined by stop means connected to the body and comprising a stem 68 having a pointed forward end 69 engageable in a conical depression in the back face of plate 53 of the piston 49. More particularly, the stem is threadedly received within a spider 70 connected across the inside of the tubular body and is provided with an actuating part 71 which is accessible from the rear end of the body to permit the longitudinal position of the stem to be adjusted, as desired. Thus, this stem permits the scraping elements to be retracted during insertion of the scraper within the open end of a pipeline, as shown in FIG. 6. Obviously, when the scraper has been so inserted, the stem may be backed off to permit the scraping elements to expand into any desired degree of forceful engagement with the pipeline wall. As shown in FIG. 3, a flange 72 on the stem 68 intermediate its threaded portion and the forward end 69 thereof prevents such stem from being backed off from the spider 70.

This stem is also useful in protecting the brushes of the scraping elements during passage of the scraper by valve openings and the like in the line. That is, this stem is useful in preventing the brushes from flying into such openings to such an extent that their bristles are damaged upon engagement with the forward ends of the openings. In this respect, when the scraper has been inserted into the line, it may be advisable to back the stem off out of engagement with the rear of the piston so that the scraping elements are free to accommodate the scraper to pipeline enlargements, while at the same time providing a limit to the extent that the brushes might fly into such openings.

As shown in FIG. 3 but removed from FIG. 1, a plurality of rollers 73 may be carried about and resiliently urged away from the scraper body 22 for rotatable engagement with the pipeline wall. As described in my copending application Serial Number 642,810, filed Feb. 27, 1957, now Patent No. 2,909,796, these rollers may comprise a cam part having a spiraled periphery so arranged as to jar against the pipeline wall as the portion thereof of greatest radial extent rotates toward disengagement from the wall. Thus, as the scraper travels through the line, these rollers 73 will audibly indicate its position. As shown in FIG. 3, these rollers 73 are preferably arranged in front of the scraping elements 24, and are mounted on the outer ends of leaf springs 74 connected at their inner ends to the body so as to be flexible in a manner similar to the cups 23 and scraping elements 24. More particularly, the leaf springs 74 are connected adjacent the leaf springs 25 by means of the bolts 30.

As also pointed out in this copending application, these rollers are useful in protecting the scraping elements from damage upon movement of the scraper past valve openings in the line. They are particularly useful in the scraper of the present invention, and in conjunction with stem 68, in providing such protection during passage of the scraper through minimum pipeline diameters.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipeline scraper comprising a body adapted to be moved longitudinally through a pipe line; seal means carried by the body in position to seal between the body and the pipeline wall, said body and seal means being movable through the pipeline by flow of fluid therethrough; a plurality of uniform symmetrical scraping elements each having a pipeline wall scraping face with opposite sides tapering divergently from each other and disposed symmetrically about the longitudinal axis of the respective scraping element; and means carrying the scraping elements on the body for resiliently engaging the wall of the pipeline with the scraping faces in a single annular row around the body and with the longitudinal axes of the scraping elements parallel to that of the body, each of said scraping faces being arranged symmetrically of a longitudinal axis of the carrying means therefore, the tapered opposite sides of the scraping face of each element being divergent in a longitudinal direction opposite to that in which the tapered opposite sides of the scraping face of each adjacent element are divergent, said adjacent elements being spaced sufficiently close together so that the wide ends of their scraping faces overlap laterally of one another when said elements are engaged with the pipeline wall to provide full circle scraping coverage thereof.

2. A pipeline scraper comprising a body adapted to be moved longitudinally through a pipeline; seal means carried by the body in position to seal between the body and the pipeline wall, said body and seal means being movable through the pipeline by flow of fluid therethrough; a plurality of uniform symmetrical scrapping elements each having a pipe wall scraping face; and resilient means mounting the scraping elements on the body for movement laterally of the body and with the scraping faces thereon in a single annular row around the body with the longitudinal axes of the elements parallel to that of the body, each scraping face being arranged symmetrically of the longitudinal axis of its resilient mounting means and each of said pipe wall scraping extending over a substantial portion of the length and breadth of the element and being disposed symmetrically about the longitudinal axis thereof, the scrapping face of each element being wider at one end thereof than at the other with the wide end of the face on one element disposed laterally opposite the narrow ends of the scraping faces of elements to each side thereof, adjacent elements being spaced sufficiently close together that the wide ends of the scraping faces thereof overlap laterally of one another when they are engaged with the pipeline so as to provide full circle coverage with a single row of scraping elements.

3. A pipeline scraper of the character defined in claim 2 wherein each scraping element is carried from the body by an arm connected to the scraping element; said arm having its longitudinal axis lying in a plane containing the longitudinal axis of the respective body and element.

4. A pipeline scraper of the character defined in claim 1 wherein each of the sides of said scraping elements is straight and substantially parallel to a side of an adjacent element when said scraping elements are engaged with the pipeline wall.

5. A pipeline scraper comprising a body adapted to be moved longitudinally through a pipeline; seal means carried by the body in position to seal between the body and the pipeline wall, said body and seal means being movable through the pipeline by flow of fluid therethrough; a plurality of brushes each having a symmetrical substantially triangularly shaped pipe wall scraping face; and resilient means mounting the brushes on the body for movement laterally of the body and with the pipe wall scraping faces thereof in an annular row around the body with a longitudinal axis of the brushes parallel to that of said body and the apices of alternate brushes extending in opposite directions, adjacent brushes being spaced close enough together with their bases opposite their respective apices overlap laterally of one another when they are engaged with the pipeline wall so as to provide full circle scraping coverage thereof, and each pipe wall scraping face being arranged symmetrically of the longitudinal axes of the brush and resilient means on which it is mounted.

6. A pipeline scraper, comprising a body adapted to be moved longitudinally through a pipeline, a cup about the body for peripheral engagement with the wall of the pipeline, a plurality of scraping elements carried from the body by leaf springs for resilient engagement with the pipeline wall, piston means on the body having a pressure responsive face confined for communication with fluid behind the cup and arranged to urge the piston means in one direction due to the pressure of such fluid, and means connecting the scraping elements to the piston means for retraction from the pipeline wall upon movement of the piston means in said one direction.

7. A pipeline scraper of the character defined in claim 6, wherein said piston means comprises a single piston to which each of said scraping elements is connected.

8. A pipeline scraper comprising a body adapted to be moved longitudinally through a pipeline, seal means carried by the body for forming a peripheral seal with the wall of the pipeline, a plurality of scraper elements, resilient means mounting the scraper elements on the body and urging them laterally outwardly thereof for scraping engagement with the pipeline wall, pressure responsive means on the body having a pressure responsive face confined for communication with fluid behind the seal means and movable in one direction responsive to an increase in pressure of such fluid, and means connecting the scraping elements to the pressure responsive means so that movement of the pressure responsive means in said one direction moves the scraping elements in a direction away from the pipeline wall.

9. A pipeline scraper, comprising a tubular body adapted to be moved longitudinally through a pipeline, seal means about the body for peripheral engagement with the wall of the pipeline, a plurality of scraping elements carried by the body for resilient engagement with the pipeline wall, a piston sealably slidable longitudinally within the body and having a pressure responsive face confined for communication with the fluid behind the seal means and arranged to urge the piston in one direction due to the pressure of said fluid, means connecting each of the scraper elements to the piston for retraction from the pipeline wall upon movement of said piston in said one direction, and stop means on the body engageable with the piston to limit movement thereof in an opposite direction.

10. A pipeline scraper of the character defined in claim 9, wherein said stop means includes a stem movable axially of the body and having an actuating part accessible from the rear of the body.

11. A pipeline scraper, comprising a tubular body adapted to be moved longitudinally through a pipeline, seal means about the body for peripheral engagement with the wall of the pipeline, a plurality of scraping elements carried by the body for resilient engagement with the pipeline wall, a piston sealably slidable longitudinally within the body and having a pressure responsive face confined for communication with the fluid behind the body and arranged to urge the piston in one direction due to the pressure of said fluid, means connecting each of the scraper elements to the piston for retraction from the pipeline wall upon movement of said piston in the one direction, and a part accessible from the rear end of the body for moving said piston in said one direction.

12. A pipeline cleaning device comprising, a body portion adapted to be disposed in and moved longitudinally of said pipeline, seal means carried by the body portion for forming a sliding seal with the pipeline, resiliently outwardly biased cleaning means carried by the body portion for relative movement with respect thereto, pressure responsive means carried by the body portion and connected with the cleaning means so that upon movement of the pressure responsive means in one direction, the cleaning means are moved thereby toward the body portion, said pressure responsive means having one side exposed to fluid pressure to the rear of said seal means, said one side being disposed so that the pressure to the rear of the seal means acts thereagainst to move the pressure responsive means to retract the cleaning elements toward the body.

13. The device of claim 12 wherein said pressure responsive means includes a piston slidable in a cylinder provided by the body, the rear side of said piston being exposed to pressure rearwardly of the device and the forward side of said piston forwardly of the device.

References Cited in the file of this patent

UNITED STATES PATENTS

| | | |
|---|---|---|
| 146,176 | Freeman | Jan. 6, 1874 |
| 168,072 | Williams | Sept. 21, 1875 |
| 227,398 | Williams | May 11, 1880 |
| 390,060 | Blanchard | Sept. 25, 1888 |
| 393,810 | Barker | Dec. 4, 1888 |
| 1,631,562 | Thompson et al. | June 7, 1927 |
| 1,696,677 | Hayton | Dec. 25, 1928 |
| 1,814,752 | Griffin | July 14, 1931 |
| 2,750,612 | Ver Nooy | June 19, 1956 |

OTHER REFERENCES

T. D. Williamson, Inc., Bulletin A-450 (c. 1954).